(12) United States Patent
Lee

(10) Patent No.: US 8,353,243 B2
(45) Date of Patent: Jan. 15, 2013

(54) FRYING PAN

(75) Inventor: Hyun Sam Lee, Busan (KR)

(73) Assignee: Chefel Co., Ltd., Busan (KR)

( * ) Notice: Subject to any disclaimer, the term of this patent is extended or adjusted under 35 U.S.C. 154(b) by 599 days.

(21) Appl. No.: 12/297,545

(22) PCT Filed: Aug. 30, 2006

(86) PCT No.: PCT/KR2006/003429
§ 371 (c)(1),
(2), (4) Date: Jan. 22, 2009

(87) PCT Pub. No.: WO2007/119909
PCT Pub. Date: Oct. 25, 2007

(65) Prior Publication Data
US 2009/0173239 A1  Jul. 9, 2009

(30) Foreign Application Priority Data

Apr. 18, 2006 (KR) .................. 10-2006-0035019
Apr. 18, 2006 (KR) .................. 20-2006-0010383 U
Aug. 16, 2006 (KR) .................. 10-2006-0077182

(51) Int. Cl.
*A47J 37/10* (2006.01)
(52) U.S. Cl. ............. 99/425; 99/403; 99/423; 99/426; 220/573.1; 220/676; 220/912
(58) Field of Classification Search .......... 99/422, 99/423, 425, 426, 403; 220/573.1, 676, 912
See application file for complete search history.

(56) References Cited

U.S. PATENT DOCUMENTS

| | | | | |
|---|---|---|---|---|
| 216,346 A | * | 6/1879 | Read | 220/771 |
| 367,250 A | * | 7/1887 | Sperry | 222/465.1 |
| 547,759 A | * | 10/1895 | Baraban | 126/246 |
| 754,310 A | * | 3/1904 | Horine | 222/474 |
| 757,281 A | * | 4/1904 | De Sachet | 222/189.07 |
| 894,118 A | * | 7/1908 | Compston | 222/129 |
| 1,377,258 A | * | 5/1921 | Lame | 99/425 |
| 1,398,655 A | * | 11/1921 | Smith | 99/423 |
| 1,447,813 A | * | 3/1923 | Patrick | 99/425 |
| 1,460,380 A | * | 7/1923 | Hughes | 99/425 |
| 1,467,272 A | * | 9/1923 | Hazlehurst | 99/425 |
| 1,469,318 A | * | 10/1923 | Deetrick | 222/145.1 |
| 1,707,532 A | * | 4/1929 | Moon | 99/339 |
| 1,733,450 A | * | 10/1929 | Detwiler | 99/340 |
| 1,970,723 A | * | 8/1934 | Wolfe | 220/573.2 |
| 2,006,704 A | * | 7/1935 | Van Muffling | 222/173 |
| 2,008,767 A | * | 7/1935 | Munn | 99/425 |
| 2,011,752 A | * | 8/1935 | Christman | 220/769 |

(Continued)

FOREIGN PATENT DOCUMENTS

JP  50-051966  5/1975
JP  3050170  6/1998

*Primary Examiner* — Gene Kim
*Assistant Examiner* — Alexander Niconovich
(74) *Attorney, Agent, or Firm* — Rothwell, Figg, Ernst & Manbeck, P.C.

(57) ABSTRACT

A frying pan having an arced opening for pouring out cooked stuff, which is formed to the extent of a peripheral portion of a flange that outwardly projects from a periphery of the pan side wall, and having a spill opening formed on at least one end of the flange by gradually narrowing the flange from the periphery of the side wall toward the end of the upper surface of the spill opening.

14 Claims, 7 Drawing Sheets

U.S. PATENT DOCUMENTS

| | | | | |
|---|---|---|---|---|
| 2,262,302 | A * | 11/1941 | Sinclair | 99/425 |
| 2,492,053 | A * | 12/1949 | Mendel et al. | 99/446 |
| 2,534,407 | A * | 12/1950 | Bramberry, Jr. | 126/390.1 |
| D162,791 | S * | 4/1951 | Citero | D7/359 |
| 2,554,412 | A * | 5/1951 | Kavanagh | 99/425 |
| 2,579,258 | A * | 12/1951 | Heckert | 99/349 |
| 2,779,266 | A * | 1/1957 | Di Trapani | 99/425 |
| 2,867,352 | A * | 1/1959 | Kawano | 220/366.1 |
| 3,847,068 | A * | 11/1974 | Beer et al. | 99/425 |
| 4,310,418 | A * | 1/1982 | Busbey | 210/467 |
| 4,352,324 | A * | 10/1982 | Noh | 99/425 |
| 5,121,848 | A * | 6/1992 | Waligorski | 220/755 |
| 5,201,264 | A * | 4/1993 | Thelen et al. | 99/403 |
| 5,323,693 | A * | 6/1994 | Collard et al. | 99/425 |
| 5,388,732 | A * | 2/1995 | Greger | 222/572 |
| 5,613,618 | A * | 3/1997 | Raoult | 220/369 |
| 5,967,024 | A * | 10/1999 | DeMars | 99/425 |
| D420,848 | S * | 2/2000 | Neidigh | D7/360 |
| 6,237,470 | B1 * | 5/2001 | Adams | 99/422 |
| 6,334,386 | B1 * | 1/2002 | Iacchetti | 99/425 |
| D455,315 | S * | 4/2002 | Cheng | D7/354 |
| 6,401,602 | B1 * | 6/2002 | Lin | 99/339 |
| 6,419,107 | B1 * | 7/2002 | Cheng | 220/573.1 |
| 6,497,174 | B1 * | 12/2002 | Cacace | 99/422 |
| 6,520,383 | B1 * | 2/2003 | Brest | 222/189.07 |
| 6,829,984 | B1 * | 12/2004 | Leibowitz | 99/425 |
| 6,990,893 | B2 * | 1/2006 | Cheng | 99/422 |
| 7,059,240 | B2 * | 6/2006 | Kim | 99/339 |
| D572,077 | S * | 7/2008 | Duke | D7/387 |
| 7,415,922 | B2 * | 8/2008 | Cheng | 99/425 |
| 7,451,897 | B2 * | 11/2008 | PaPasodero | 222/189.07 |
| D586,177 | S * | 2/2009 | Loring | D7/361 |
| D600,497 | S * | 9/2009 | Ek | D7/361 |
| 7,607,387 | B2 * | 10/2009 | Stanczak | 99/425 |
| D603,213 | S * | 11/2009 | Ek | D7/360 |
| D618,494 | S * | 6/2010 | Welk et al. | D7/361 |
| 7,798,372 | B2 * | 9/2010 | Archer, Jr. | 222/189.07 |
| 7,802,702 | B2 * | 9/2010 | Archer, Jr. | 222/189.07 |
| D628,851 | S * | 12/2010 | Bergne | D7/361 |
| 2004/0261630 | A1 * | 12/2004 | Leibowitz | 99/425 |
| 2005/0204931 | A1 * | 9/2005 | Cheng | 99/422 |
| 2005/0263011 | A1 * | 12/2005 | Golding | 99/422 |
| 2007/0261568 | A1 * | 11/2007 | Smothers | 99/424 |
| 2008/0011164 | A1 * | 1/2008 | B'ham | 99/403 |
| 2008/0060530 | A1 * | 3/2008 | Tetreault et al. | 99/355 |
| 2009/0007801 | A1 * | 1/2009 | Giner Pena | 99/425 |

* cited by examiner

Figure 9        PRIOR ART
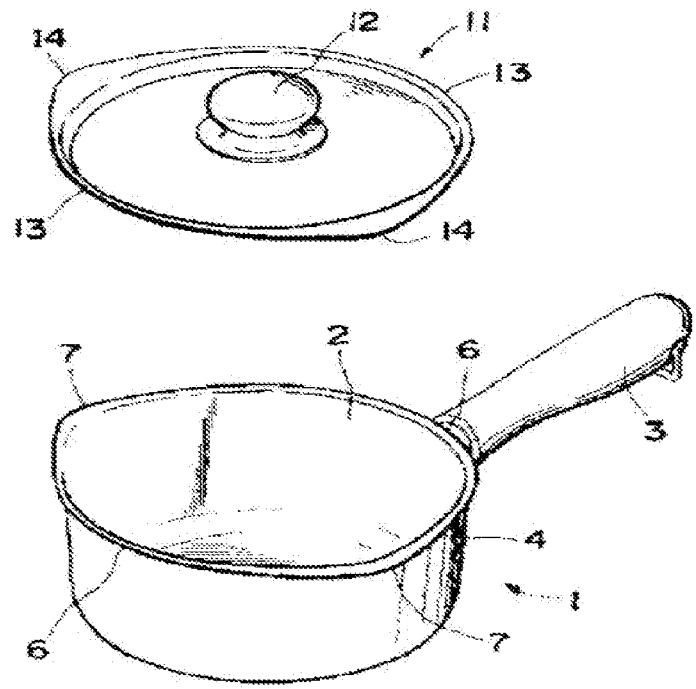
Figure 10        PRIOR ART
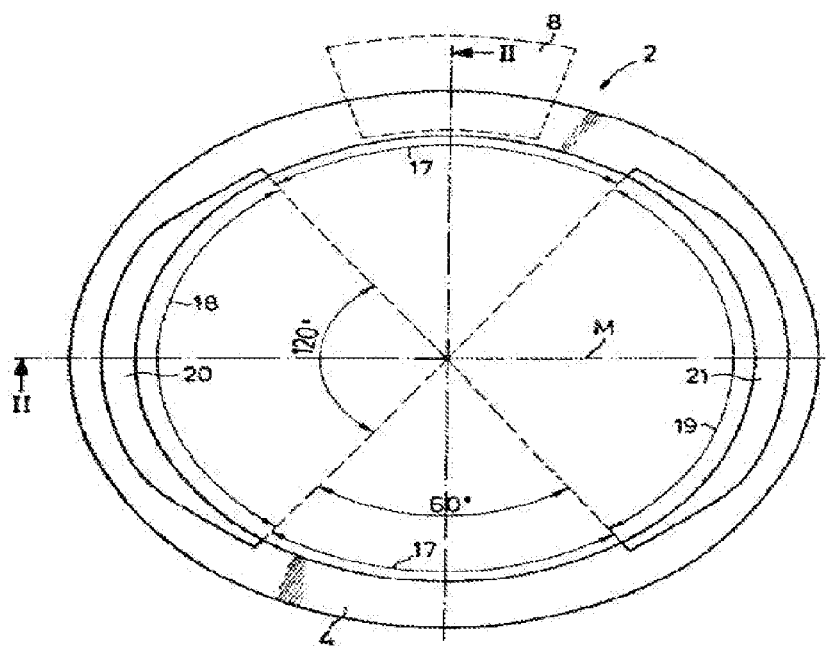

FRYING PAN

CROSS REFERENCE TO RELATED APPLICATIONS

This application is a 35 USC §371 National Phase Entry Application from PCT/KR2006/003429, filed Aug. 30, 2006, and designating the United States. This application claims priority under 35 U.S.C. §119 based on Korean Patent Application No. 10-2006-0035019 filed Apr. 18, 2006; Korean Patent Application No. 20-2006-0010383 filed Apr. 18, 2006; and Korean Patent Application No. 10-2006-0077182 filed Aug. 16, 2006, which are incorporated herein in their entireties.

TECHNICAL FIELD

The present invention relates to a flying pan furnished with an arced opening for pouring out cooked stuff, which is formed to the extent of a peripheral portion of a flange.

BACKGROUND ART

As shown in FIG. 9, a prior art 1 (Japanese Utility Model Registration No. 3050170) discloses a pot, in which an upper surface of a pot body (1) comprises a circular portion (6) and an outwardly expanding portion (7). Due to the outwardly expanding portion (7), the pot body (1) is deformed to have a projecting portion so that the side view of the pot is not identical with the front view thereof. Moreover, an end portion of the outwardly expanding portion (7) is of a pointed shape with an acute angle. For the reason, an overall outer appearance of the pot is not so aesthetically pleasing, and cooked stuff often spills over when being poured out in a large amount. Further, since the pot body (1) comprises a relatively wide flat surface on the outwardly expanding portion (7), along which cooked stuff may run down on a lateral wall.

Another prior art 2 (Korean Patent Number 1995-0004431) illustrated in FIG. 10 discloses a cooking vessel (2) comprising a planar rim (4) outwardly bent at an upper circumference of a vessel body, and a vessel handle attached to an outer surface of a vessel wall (6), wherein a spill or ventilation opening is formed between the vessel body and a lid when the lid is closed in such a manner that the planar rim of the vessel body closely comes into contact with a rim of the lid. The vessel wall has a peripheral region (18) in which a width of the planar rim (4) is narrow. Such a peripheral region (18) is provided with a slope (20) that is larger than that of the other peripheral region (17). Correspondingly, radially formed on the rim of the lid is a spill arch that defines the spill opening in conjunction with the slope (20) of the vessel wall. A circumferential length of the peripheral region (17) in the vessel wall without the slope (20) is at least the same with that of a segment of the lid having the spill arch. The vessel handle (8) is disposed on the vessel wall at about 90 degree with respect to a center line M of the peripheral regions (18, 19) having slopes (20, 21). The lid is equipped with a lid handle spanning thereof while maintaining about 90 degree with respect to a center line of peripheral segment (22) having the spill arch. With such an arrangement, when the lid is rotated to open the spill opening, the vessel handle (8) is configured to be aligned with the lid handle. When the lid is in a closed state of the spill opening, the lid handle is displaced about 90 degree relative to the vessel handle (8).

DISCLOSURE

Technical Problem

However, since a bottom and an entire side wall of the aforementioned cooking vessel constitute an oval shape, the spill opening is not broad enough to pour out a large amount of cooked stuff in a desirous manner. Moreover, due to a flat surface formed between the planar rim (4) and the slopes (20, 21), cooked stuff may spill on an unintended place running down along the flat surface when being poured out.

Technical Solution

The present invention aims at solving the aforementioned drawbacks of the conventional cooking vessels. Therefore, it is an object of the present invention to provide a flying pan, with which a large amount of cooked stuff can be poured out at a desired place in a reliable manner.

In order to accomplish the foregoing object, an embodiment of a frying pan according to the present invention comprises a bottom, a side wall extending upwardly from a circumference of the bottom, a flange projecting from a periphery of the side wall, and a spill opening formed on at least one side of the side wall and the flange. An arc segment of non-flat surface is provided at an end of an upper surface of the flange by narrowing a width of the flat surface from the periphery of the side wall toward the end of the upper surface of the flange. An arc segment of a convex slope is provided on a boundary portion between the side wall and the flange.

According to such an embodiment, by virtue of the arc segment of non-flat surface provided at the end of the upper surface of the flange, a free end of the spill opening comes to be wider, so that a large amount of cooked stuff can be poured out at a desired place in a reliable manner.

In the foregoing embodiment, the bottom is a circular shape, and an outer circumference of the flange is an oval shape. By positioning the spill opening on a major axis of the flange, it is advantageous in providing a streamline with the spill opening.

Alternatively, the bottom is an oval shape, and an outer circumference of the flange is a circular shape. In this instance, by furnishing the spill opening on a portion of the flange, which corresponds to a minor axis of the bottom, it is advantageous in cooking long stuff such as fish or the like.

Further, the flange is provided with a protrusion, by which it is possible not only to prevent cooked stuff from spilling over to the side wall, but also to improve thermal efficiency by defining space in cooperation with the side wall, which serves to suppress dissipation of uprising heat.

A portion of an upper surface of the flange, in which the spill opening is formed, is disposed at a lower position than a remainder portion of the upper surface of the flange. With such an arrangement, cooked stuff being poured out is configured to be concentrated toward the spill opening, thereby cooked stuff can be precisely poured out at a desired place.

Further, the remainder portion of the upper surface of the flange is designed to slant toward the bottom, so that oil spattered on the upper surface of the flange is directed to flow into the bottom as much as possible.

Advantageous Effects

The frying pan according to the present invention has advantageous effects as follows.

First, by providing an arc segment whose width is gradually narrowed from the periphery of the side wall toward the end of the upper surface of the flange, it is possible to prevent cooked stuff from running down along a neighboring flat surface of the flange when cooked stuff is poured out. In addition, without protrudent deformation of the side wall, an arc length of the spill opening can be relatively long enough to properly pour out a large amount of cooked stuff. Moreover, when using a scoop for turning upside down, for example, a fish or an egg, the frying pan is advantageous in that the scoop can be naturally oriented in the most convenient position for turning upside down cooked stuff.

Second, by virtue of the protrusion formed at the flange, it is possible not only to prevent the cooked stuff from spilling over to the side wall, but also to improve thermal efficiency by defining space in cooperation with the side wall, which functions as a heat-circulating guide.

Third, since the portion of an upper surface of the flange, including the spill opening, is disposed at a lower position than a remainder portion of the upper surface of the flange, cooked stuff is configured to be concentrated toward the spill opening when being poured out, thereby further preventing spillover through vicinity of the spill opening.

Fourth, because the upper surface of the flange is designed to slant toward the bottom, escape of oil spattered on the upper surface of the flange is restrained as much as possible.

DESCRIPTION OF DRAWINGS

FIG. 9 is a perspective view of a frying pan according to prior arts;
and
FIG. 10 is a perspective view of another frying pan according to prior arts.

Figure 1:
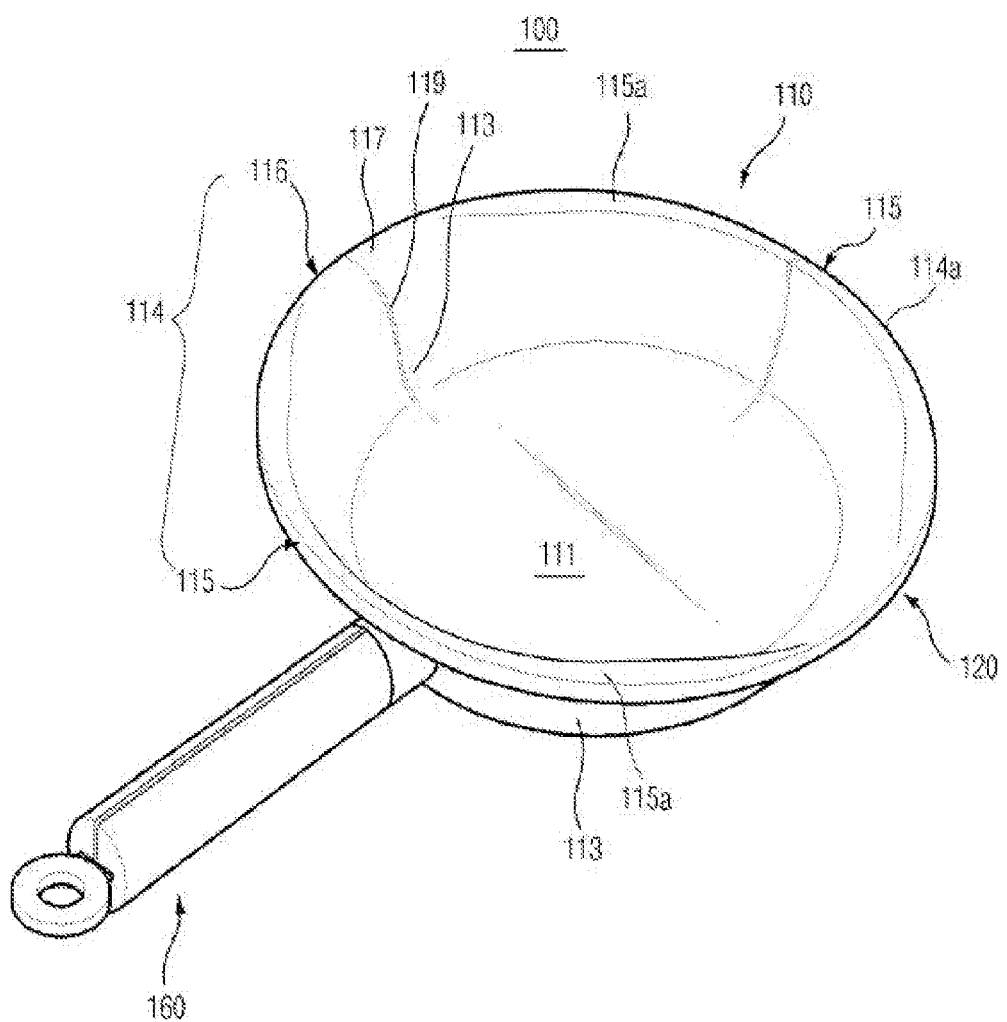
FIG. 1 is a perspective view of a frying pan according to a preferred embodiment 1 of the present invention.

| <Reference numerals> | | | |
|---|---|---|---|
| 100: | frying pan | 110: | pan body |
| 111: | bottom | 113: | side wall |
| 115, 116: | flange | 117: | arc segment of non-flat surface |
| 119: | arc segment of a convex slope | 120: | spill opening |
| 130: | protrusion | 160: | handle |

BEST MODE

Hereinafter, preferred embodiments of the present invention are described in detailed with reference to the accompanying drawings.

First Embodiment

Figure 2:
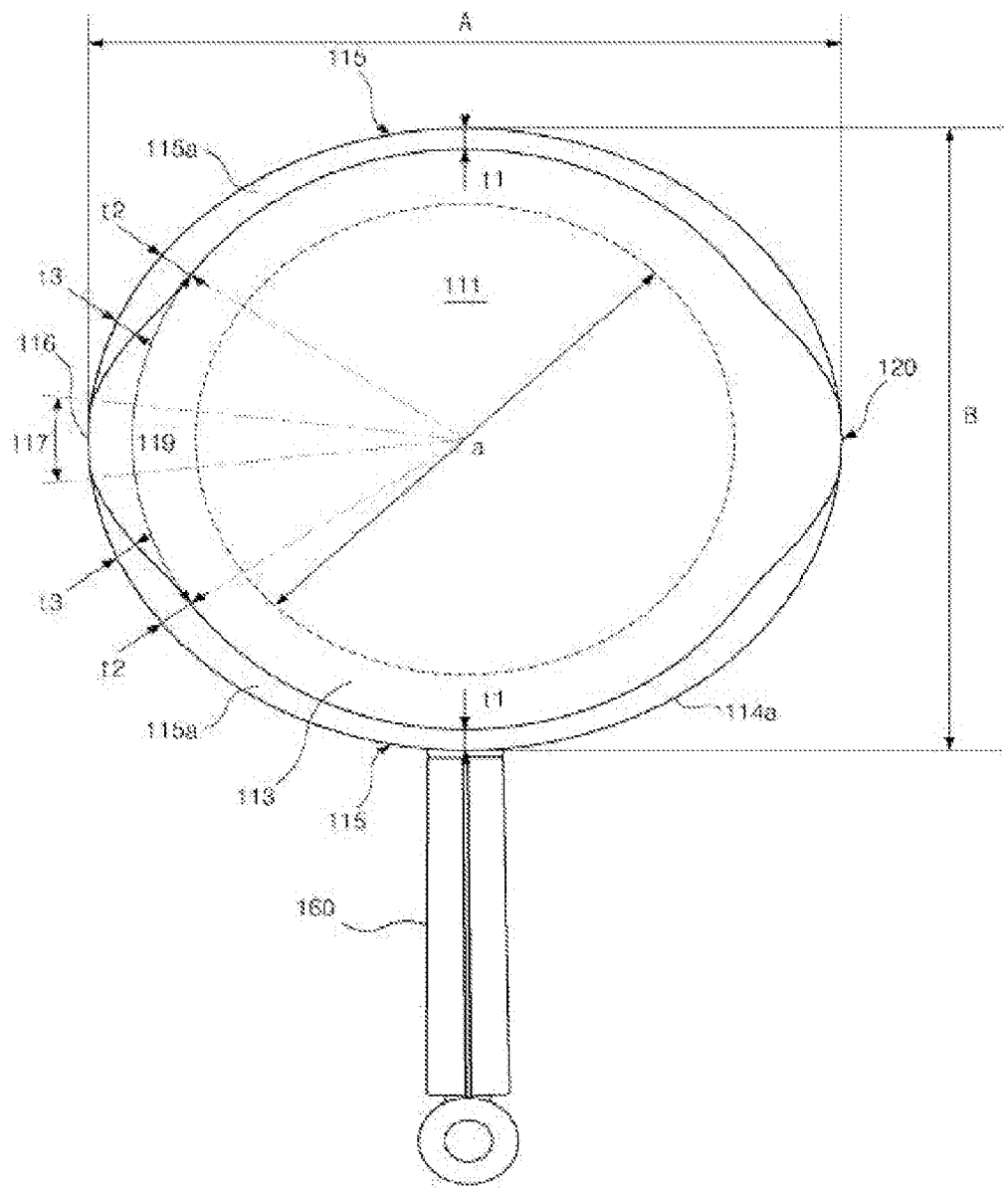
FIG. 2 is a top plan view of the frying pan depicted in FIG. 1.
Figure 3:
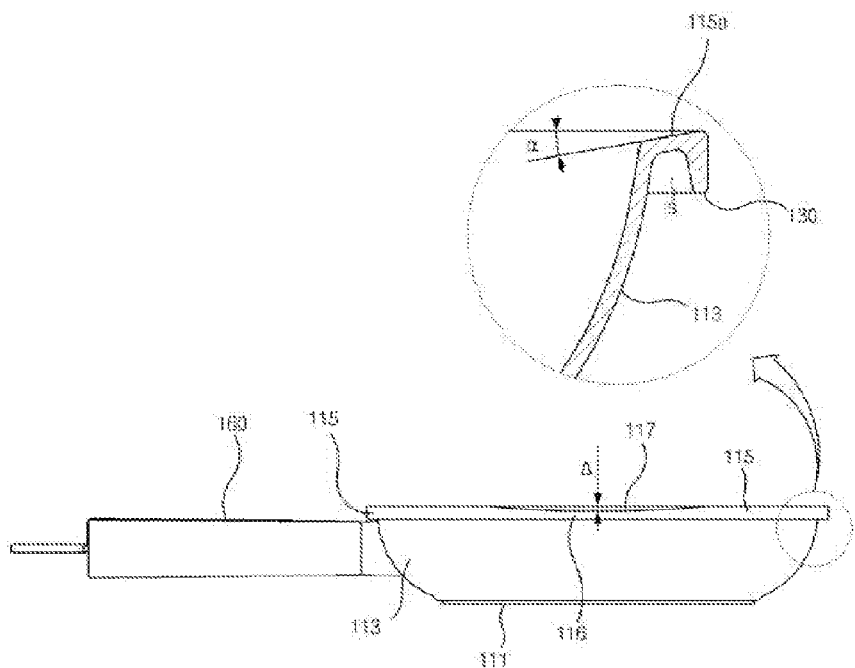
FIG. 3 is a front view of the frying pan depicted in FIG. 1.
Figure 4:
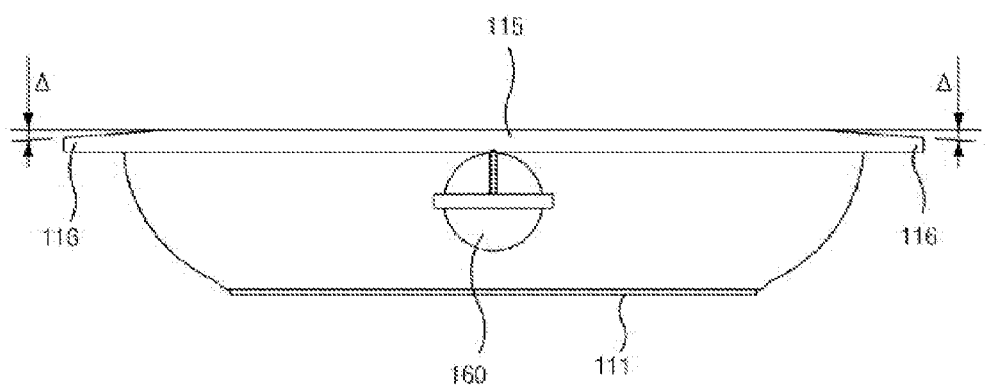
FIG. 4 is a left-side view of the frying pan depicted in FIG. 1.
Figure 5:
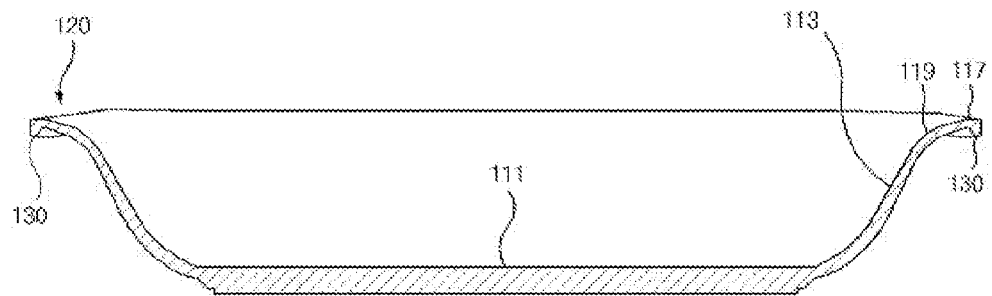
FIG. 5 is a sectional view of the frying pan depicted in FIG. 4.

A Frying Pan Equipped with a Circular Bottom and a Flange Having an Oval Outer Circumference FIG. 1 is a perspective view of a frying pan according to a preferred embodiment 1 of the present invention, FIG. 2 is a top plan view of the frying pan depicted in FIG. 1, FIG. 3 is a front view of the frying pan depicted in FIG. 1, FIG. 4 is a left-side view of the frying pan depicted in FIG. 1, and FIG. 5 is a sectional view of the frying pan depicted in FIG. 4.

As shown in FIGS. 1 to 5, the frying pan (100) according to a first embodiment mainly comprises a pan body (110) defining an outer appearance, and a handle (160). In the present embodiment, the handle (160) may be left out if a user can hold the pan body (110) by using an additional grabbing means. The handle (160) is preferably placed on a side wall (113) lying in a minor axis (B) that will be described later.

The pan body (110) includes a circular bottom (111) with diameter of 'a' a side wall (113) extending upwardly from a circumference of the bottom (111), a flange (114) outwardly projecting from a periphery of the side wall (113), whose outer circumference (114a) is an oval shape, and a spill opening (120) formed at one end or both ends of the flange (116) lying in a major axis (A).

The oval-shaped flange (114) is composed of a flange (115) having at least a flat surface (115a), and a flange (116) having non-flat surface (115a). The flange having non-flat surface (115a) means that there is non-flat surface at all on the flange, or a bit of flat surface inevitably occurred by tolerance in manufacturing or molding designing is provided on the flange.

The spill opening (120) is formed in an arc segment whose width is narrowed from the periphery of the side wall (113) toward the end (117) of the upper surface of the flange (116), lying in the major axis (A). Namely, formed at the end of the upper surface lying in the major axis (A) is an arc segment (117) of non-flat surface (115a).

As shown in FIGS. 1 and 5, the spill opening (120) is further provided with an arc segment (119) of a convex slope at a boundary portion between the side wall (113) and the flange (116). As the width of the arc gets narrow from the arc segment (119) to the arc segment (117), a width of the flat surface (115a) gradually gets thick from the both ends of the minor axis (B) toward the arc segment (119) (t1→t2) and then significantly gets narrow toward the arc segment (117) (t2→t3).

By virtue of the arc segment (117) of non-flat surface (115a), a mouth (117) of the spill opening (120) can be formed in a wide shape, so that a large amount of cooked stuff can be neatly poured out at a desired place without any spillover. When using a scoop for turning upside down a fish or an egg, the frying pan is advantageous in that the scoop can be naturally oriented in the most convenient angle for turning upside down cooked stuff by arrangement of the spill opening (120). Otherwise, the scoop would be used in a substantially perpendicular position, which may often causes scratches to the frying pan.

Referring to FIGS. 3 and 4, due to the wide arc segment (117), the flange (116) of non-flat surface extends further than remainder flange (115) having a flat surface. Therefore, unlike the prior arts (in which a side view and a front view of a side wall are different from each other), the pan body can be manufactured without deformation of the side wall (113). Since a side view and a front view of the side wall (113) is the same with each other, its outer appearance is aesthetically pleasing in terms of design. When stored in not in use, it is convenient in that the pans can be well piled up.

As shown in FIG. 3, the arc segment (117) of the flange (116), in which the spill opening (120) is formed, is preferably disposed at a lower position than a remainder portion of the upper surface (115a) of the flange (115).

Specifically, the arc segment (117) comes to have gradually concave curvature because there is a level difference (A) between the upper surface (115a) of the flange (115) and the arc segment (117). Such a structure facilitates to concentrate cooked stuff toward the arc segment (117) when being poured out, thereby neatly pouring out cooked stuff.

Referring to FIG. 3, the upper surface (115a) of the flange (115) is slanted by 'a' toward the bottom (111). Owing to the slant of 'a', spattered oil is naturally directed to flow inside the frying pan.

Further, downwardly extended from the flange (116 and/or 115) is a protrusion (130), by which spillover of cooked stuff along a lower surface of the flange and the side wall (113) can be prevented. Moreover, the protrusion (130) also serves to improve thermal efficiency by defining space (S) in cooperation with the side wall (113), the space (s) being beneficial to suppress of the dissipation of uprising heat and recirculate it.

Second Embodiment

A Frying Pan Equipped with a Circular Bottom and a Flange Having a Circular Outer Circumference A frying pan (200) according to a second embodiment is similar to the frying pan (100) of the first embodiment in terms of its structure and function, except that an outer circumference (214a) of the flange is circular instead of being oval.

Figure 6:
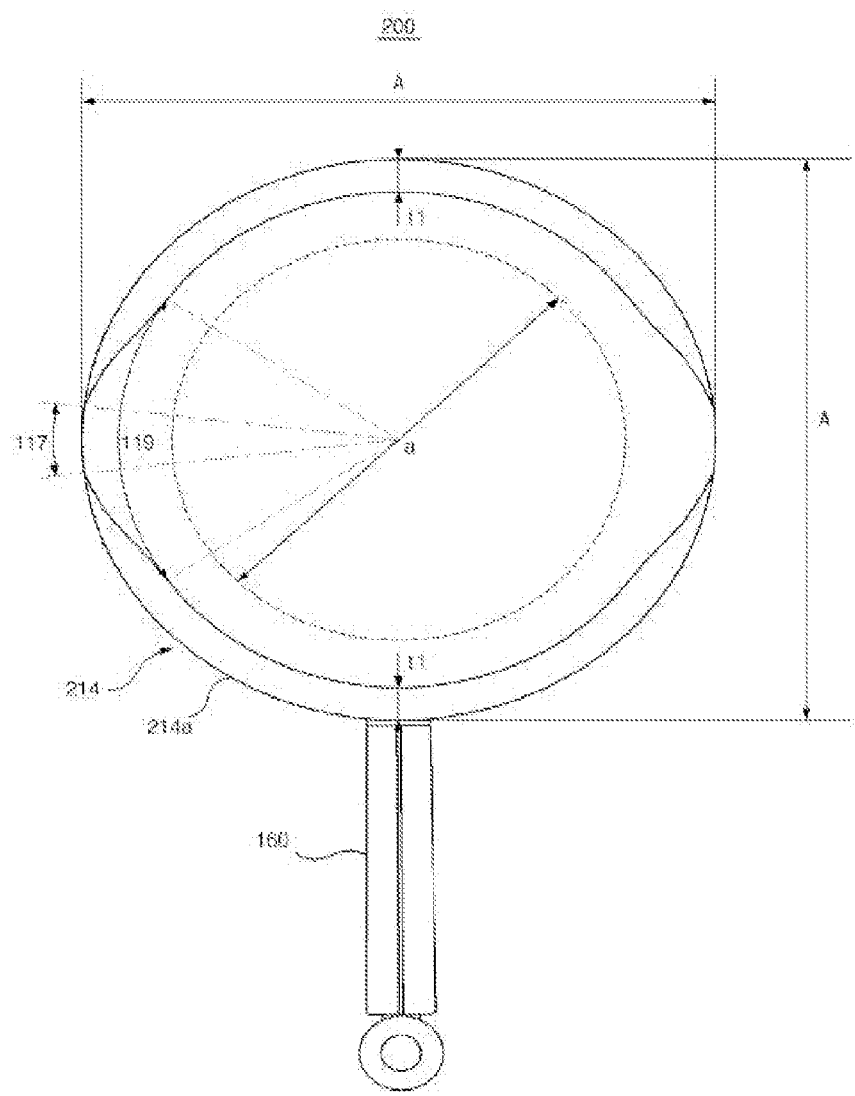
FIG. 6 is a perspective view of a frying pan according to a preferred embodiment 2 of the present invention.

Namely, as shown in FIG. 6, by equalizing lengths of the major axis (A) and the minor axis (B) of the first embodiment, a flange (214) with the outer circumference (214a) of diameter 'A' is accomplished. Therefore, a width (t1') of a flat surface is wider than the width (t1) of the flat surface (115a) in the first embodiment.

The flange (214) having the circular outer circumference (214a) endows the frying pan (200) with a well balanced image compared with an oval outer circumference.

Third Embodiment

Figure 7:
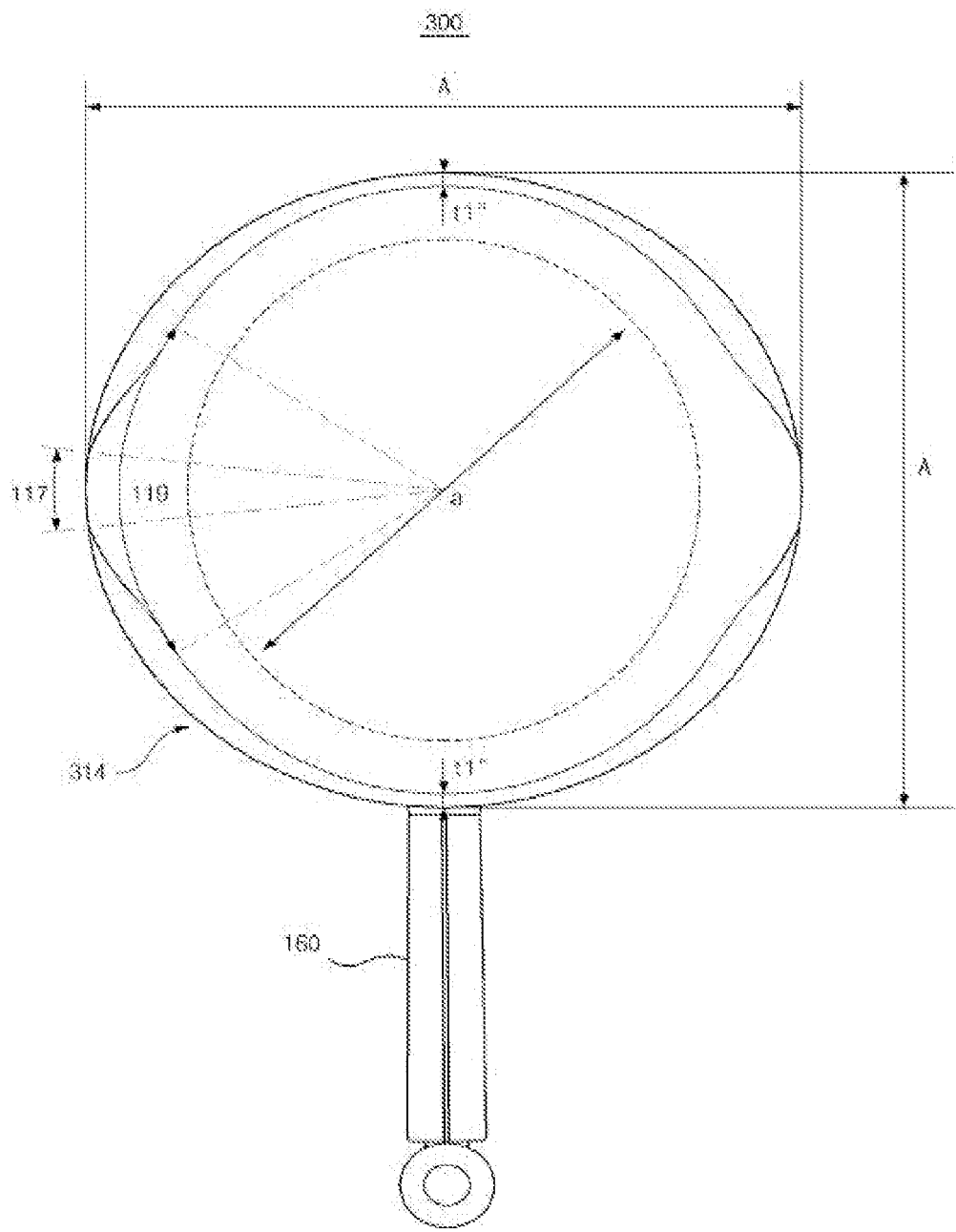
FIG. 7 is a perspective view of a frying pan according to a preferred embodiment 3 of the present invention.

A Frying Pan Equipped with a Circular Bottom and a Flange Having a Circular Outer Circumference FIG. 7 shows a frying pan (300) according to a third embodiment that is similar to the frying pan (200) of the second embodiment in terms of its structure and function, except that the upper surface of the flange (214) having the relatively wide width (t1') is substituted by an upper surface of a flange (314) having a relatively narrow width (t1"). Such modification is advantageous over the frying pan (200) with the width (t1') in terms of material-saving while maintaining a well balanced image.

Fourth Embodiment

Figure 8:
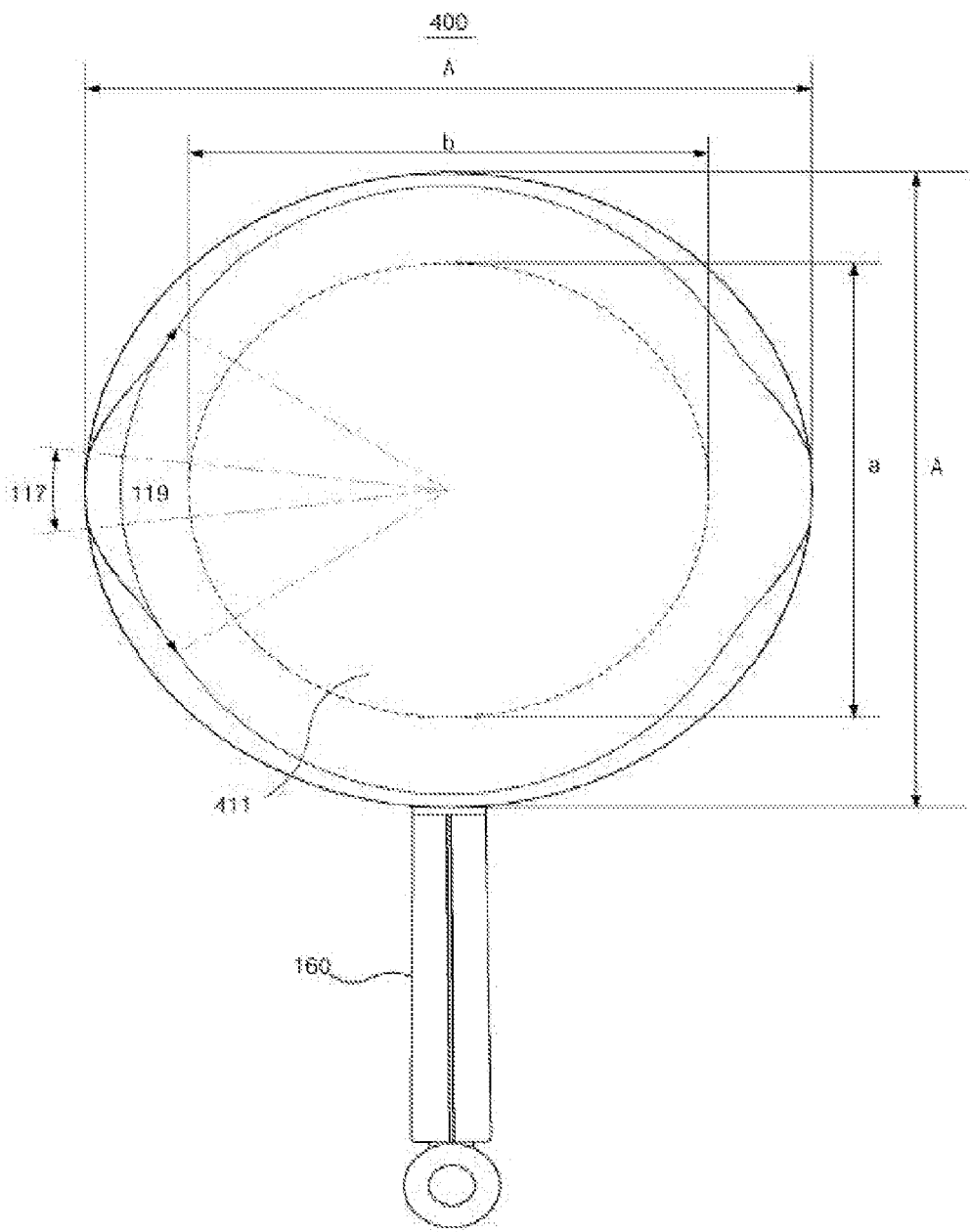
FIG. 8 is a perspective view of a frying pan according to a preferred embodiment 4 of the present invention.

A Frying Pan Equipped with an Oval Bottom and a Flange Having a Circular Outer Circumference FIG. 8 shows a frying pan (400) according to a fourth embodiment that is similar to the frying pan (300) of the third embodiment in terms of its structure and function, except that there is provided with an oval bottom (411) instead of the circular bottom (111) of the first embodiment.

A major axis (a) of the oval bottom (411) is oriented toward the handle (160) and a minor axis (b) is oriented toward the spill opening (120). Such an arrangement is beneficial in that sufficient space for the spill opening (120) is obtainable. Further, the oval bottom (411) is suitable for cooking long-sized stuff such as a fish.

INDUSTRIAL APPLICABILITY

The frying pan according to present invention is not limited by the aforementioned embodiments and it should be appreciated that various modifications can be made by a person having an ordinary skill in the art without departing from concept or spirit of the present invention.

The invention claimed is:

1. A frying pan comprising:
a bottom;
a side wall extending upwardly from a circumference of the bottom;
a flange projecting outwardly from a periphery of the side wall and having an upper surface, wherein said flange has an oval or circular outer circumference; and
a spill opening formed on at least one side of the side wall and the flange having oval or circular outer circumference, wherein said spill opening comprises an arc segment having a non-flat surface provided at an end of the upper surface of the flange, and wherein a width of the upper surface of the flange gradually narrows from the periphery of the side wall toward the end of the upper surface of the flange at said spill opening, and
wherein an arc segment (119) of a convex slope is provided on a boundary portion between the side wall and the flange, wherein side wall portions extending upwardly from said bottom at said spill opening have convex slope and said flange surface at said spill opening has a concave slope, and wherein the upper surface of the flange at the periphery of the side wall slants toward the bottom.

2. The frying pan set forth in claim 1, wherein the bottom is a circular shape, wherein an outer circumference of the flange is an oval shape, and wherein the spill opening is positioned on a major axis of the flange.

3. The frying pan set forth in claim 1, wherein the bottom is an oval shape, wherein an outer circumference of the flange is a circular shape, and wherein the spill opening is formed on a portion of the flange facing with a minor axis of the bottom.

4. The frying pan set forth in claim 1, wherein the bottom and an outer circumference of the flange are both circular shapes.

5. The frying pan set forth in claim 1, wherein a portion of an upper surface of the flange, in which the spill opening is formed, is disposed at a lower position than a remainder portion of the upper surface of the flange.

6. The frying pan set forth in claim 5, wherein the remainder portion of the upper surface of the flange is designed to slant toward the bottom.

7. The frying pan set forth in claim 1, wherein the flange is provided with a protrusion adapted for preventing cooking stuff from spilling over to the side wall.

8. The frying pan set forth in claim 2, wherein a portion of an upper surface of the flange, in which the spill opening is formed, is disposed at a lower position than a remainder portion of the upper surface of the flange.

9. The frying pan set forth in claim 3, wherein a portion of an upper surface of the flange, in which the spill opening is formed, is disposed at a lower position than a remainder portion of the upper surface of the flange.

10. The frying pan set forth in claim 4, wherein a portion of an upper surface of the flange, in which the spill opening is formed, is disposed at a lower position than a remainder portion of the upper surface of the flange.

11. The frying pan set forth in claim 2, wherein the flange is provided with a protrusion adapted for preventing cooking stuff from spilling over to the side wall.

12. The frying pan set forth in claim 3, wherein the flange is provided with a protrusion adapted for preventing cooking stuff from spilling over to the side wall.

13. The frying pan set forth in claim 4, wherein the flange is provided with a protrusion adapted for preventing cooking stuff from spilling over to the side wall.

14. The frying pan of claim 1, wherein said flange has an outer perimeter edge and wherein said flange comprises a protrusion extending downward from said outer perimeter edge.

* * * * *